UNITED STATES PATENT OFFICE.

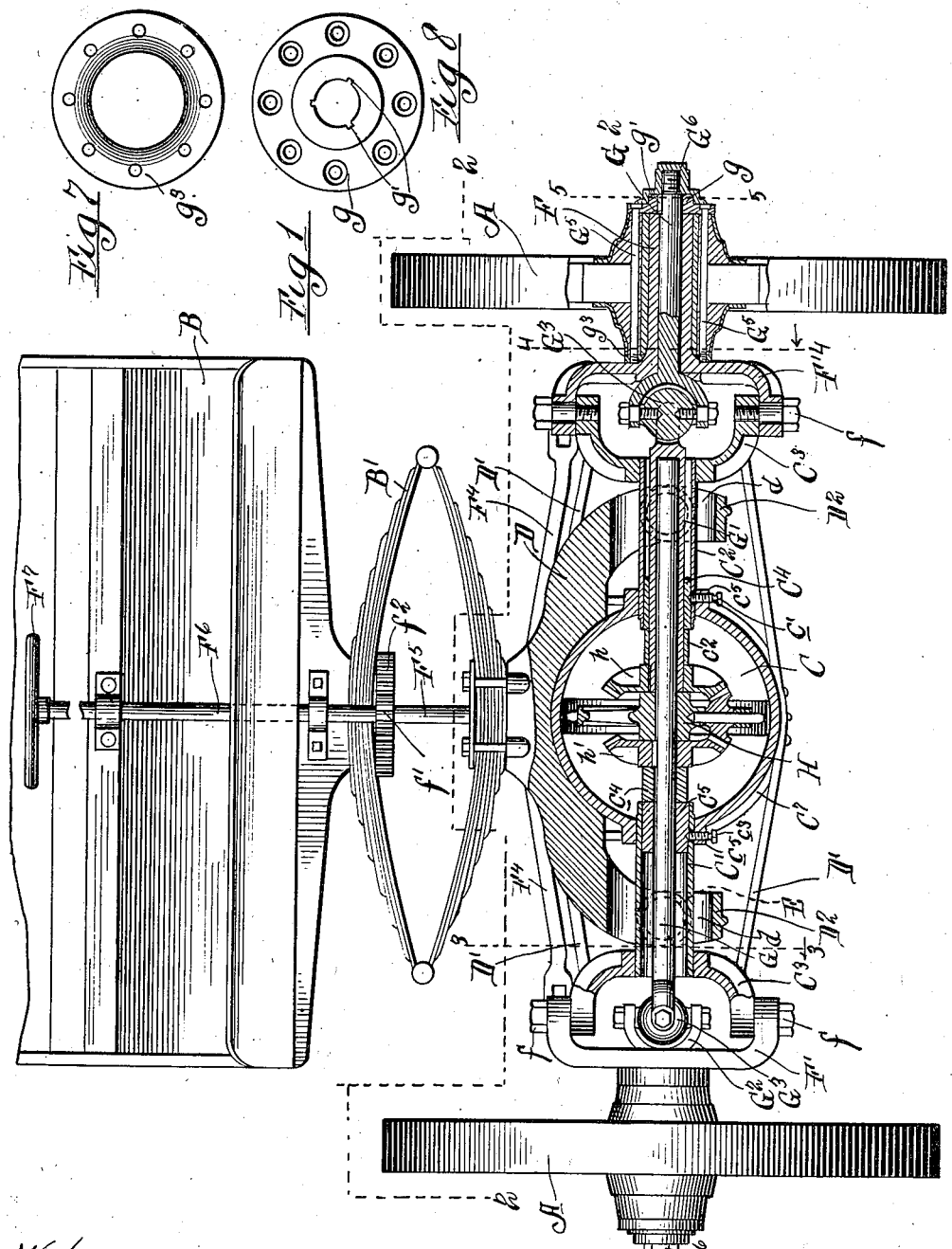

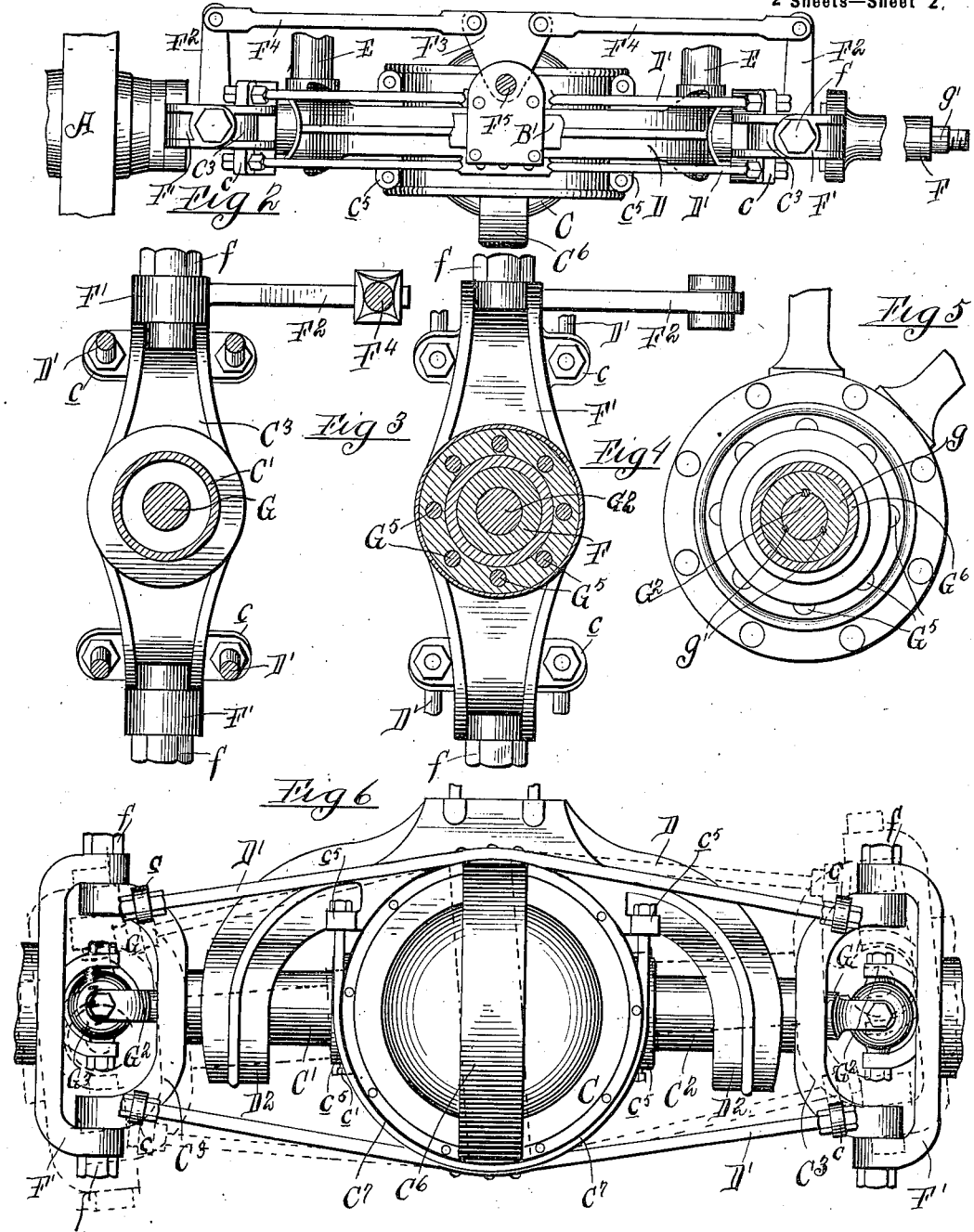

CHARLES THEODORE HILDEBRANDT AND FRANK ROSWELL McMULLIN, OF CHICAGO, ILLINOIS.

DRIVING AND STEERING MECHANISM FOR MOTOR-VEHICLES.

SPECIFICATION forming part of Letters Patent No. 641,511, dated January 16, 1900.

Application filed January 9, 1899. Serial No. 701,570. (No model.)

*To all whom it may concern:*

Be it known that we, CHARLES THEODORE HILDEBRANDT and FRANK ROSWELL MC-MULLIN, of Chicago, in the county of Cook and State of Illinois, have invented certain new and useful Improvements in Driving and Steering Mechanism for Motor-Driven Vehicles; and we do hereby declare that the following is a full, clear, and exact description thereof, reference being had to the accompanying drawings, and to the letters of reference marked thereon, which form a part of this specification.

This invention relates to improvements in motor-driven vehicles, and refers more specifically to the driving and steering devices of such vehicles of that character in which the front axle is connected with the driving power and is constructed so as to permit the steering-wheels to be swung thereon in horizontal planes for the purpose of steering the vehicle.

The invention consists in the matters hereinafter set forth, and more particularly pointed out in the appended claims.

In the drawings, Figure 1 is a front view, partly in section, of a motor-driven vehicle constructed in accordance with our invention. Fig. 2 is a plan section taken on line 2 2 of Fig. 1. Figs. 3, 4, and 5 are detail sections taken on lines 3 3, 4 4, and 5 5 of Fig. 1. Fig. 6 is a front elevation of a portion of the driving and steering devices. Figs. 7 and 8 are elevations of parts of the wheel-hub.

In said drawings, A A designate the front steering-wheels, and B the body of the vehicle. The part of said vehicle corresponding to the front axle of the usual vehicle and the purpose of which is to connect the front part of the body with the front wheels is composed of a number of separate parts, constituting a frame, and is made as follows:

C designates a cylindric casing or drum located centrally of and at the front part of the vehicle, and $C'$ $C^2$ designate oppositely-extending tubular sections which are provided on their outer ends with vertically-arranged fork-arms $C^3$ $C^3$ and pass through and are connected at their inner ends with bosses $c^5$ on said casing.

D designates a bearing-block which rests upon the drum or casing C and serves to directly support the front spring $B'$ of the vehicle.

$D'$ $D'$ designate upper and lower tie-rods which are attached at their opposite ends to lugs $c$ on the fork-arm $C^3$ and are permanently attached between their ends to the upper and lower sides of the drum or casing C. Said bearing-block D is provided on opposite sides of the drum or casing C with depending arms $D^2$, and to said arms are attached the forward ends of the side bars E of the running-gear frame. Said block is thus rigidly connected with said side bars of the running-gear frame and is incapable of movement in a vertical plane with respect to the said side bars; but the casing C and tubular sections $C'$ $C^2$ are constructed to have swinging movement in a vertical plane with respect to said bearing-block and running-gear frame, so that the body B will not be tilted when one of the wheels A passes over an obstruction.

First describing the steering mechanism or the means for producing movement of the steering-wheels about the outer end of the supporting-frame and in a manner to permit the vehicle to be steered and turned from a straight course, said frame is provided at its opposite ends with short stub-axles F, which are so pivoted to the frame as to swing in horizontal planes. As a means of attaching the said stub-axle to the frame they are herein shown as provided with inwardly-extending fork-arms $F'$, which overlap the outwardly-extending fork-arms $C^3$ of the tubular sections $C'$ $C^2$ and are connected therewith by means of vertical pivot-pins $f$, located vertically above and below the axial center of the stub-axles F.

The yoke-arms $F'$ are provided with rigidly-attached rearwardly-extending levers $F^2$, and said levers are connected with means extending to a point within reach of the operator by which the stub-axles and wheels mounted thereon may be swung about the pivots of said stub-axles to steer the vehicle. As herein shown, said rearwardly-extending levers $F^2$ are connected with a centrally-located pivoted arm or plate $F^3$ by means of connecting-rods $F^4$. To said plate or arm $F^3$ is rigidly attached a rock-shaft $F^5$, which when rotated serves, through the connecting-rods F⁴, to swing the rock-arms F², and thereby swing the stub-axles about their pivots to steer the vehicle in a well-known manner. Preferably the rock-shaft F⁵ will not itself extend within reach of the operator, but will be provided at its upper end with a pinion f', which is adapted to be engaged by a gear-wheel f², mounted upon the lower end of a second rock-shaft F⁶, which has bearing on the front of the wagon-body and is provided at its upper end with a hand-wheel F⁷, located in position to be readily grasped by the operator.

The parts above described constitute the steering and supporting mechanism of the vehicle, and said parts are constructed to carry the driving devices whereby power is communicated from the motor to the front steering-wheels. Said driving devices are constructed as follows: The driving-shaft consists of four parts—namely, two middle sections G G' and two end sections G² G². Said parts G and G' have bearing in the tubular sections C' C², while the end sections G² have bearing in the axle-sections F, which are for this purpose made tubular. Said inner and outer sections of the shafts are united by universal joints G³ of any approved form, whereby the outer sections G² may swing in a horizontal plane to conform to the movement of the stub-axles F. Said driving-shaft is connected with the source of power through the medium of a differential-gear mechanism H, and it is for this purpose that the part of the shaft between the universal joints G³ is made in two sections. The section G' consists of a tubular part, which is mounted to rotate in the tubular section C². Preferably the shaft will not have bearing contact throughout the entire length of the tubular section C², but will directly engage and have bearing contact with a bearing sleeve or bushing C⁴, which is held in place by means of set-screws c', tapped through the boss c⁵ of the casting C and through the inner end of the tubular section C². To the inner end of said shaft-section G' is attached one of the gear-wheels h of the differential-gear mechanism, and between said gear-wheel and bushing C⁴ is interposed a short tubular section c², which surrounds said tubular portion of the shaft and serves to properly space the parts on the shaft. The part G of the shaft consists of a solid shaft or rod, which has telescopic engagement with the tubular part G' and will preferably extend throughout the length of the latter. Said part G has direct bearing contact with a bearing sleeve or bushing C⁵, mounted in the inner end of the tubular section C', and is free from contact with the said tubular section in the other parts thereof. Said bushing C⁵ is held in place by means of a set-screw c³, as is the bushing C⁴, before described. One of the gear-wheels h' of the differential-gear mechanism is rigidly attached to the shaft-section G at one side of the center thereof, and between said gear-wheel and the bushing C⁵ is interposed a short tubular spacing-sleeve c⁴. The casing C is conveniently constructed to inclose the differential-gear mechanism described and is provided on one or both ends thereof with removable covers C⁶, shaped to conform to the inclosed parts. The universal joints G³ are herein shown consisting of inwardly and outwardly divergent fork-arms, which are pivoted to a ball-shaped body interposed between and embraced by the same, said pivot being arranged in two different planes at right angles to each other. The pivots of said universal joints are therefore located centrally of the fork-arms C' and F' and are in the same vertical plane with and enable the shaft-section G² to swing about the same center of oscillation as the stub-axle F.

It will be seen that the shaft, made up of the four parts, as described, has but four bearing points or sleeves—namely, the bushings C⁴ and C⁵ and the tubular stub-axles F— and that they are out of bearing contact with the parts of the frame at other points.

The means for driving the wheels A from the shaft made as thus described are constructed as follows: The outer parts G² or shaft-sections of said driving-shaft, as before stated, extend outwardly through and have bearing within the tubular stub-axles F. Each shaft-section projects some distance outside of the stub-axles, and upon said projecting part of the shaft is mounted a ring or washer g, which is secured to the shaft by means preventing rotation thereof with respect to said shaft—as, for instance, by keys g', as shown in Fig. 5—and forms, in effect, a flange on said shaft-section. Said ring fits closely against the outer end of the stub-axle and is provided radially outside of said stub-axle with a circular series of bolt-apertures, and through said apertures and longitudinal apertures in the hub are passed a plurality of screws or bolts G⁵. The hub will desirably be made of wood and bored to permit the passage of said bolts therethrough. Said bolts are screw-threaded at their inner ends and engage screw-threaded apertures in a ring or washer g³, interposed between the rear end of the hub and the fork-arms F' of the stub-axle F. Said ring or washer is interiorly conformed to the shape of the adjacent faces of the fork-arms, as shown in Fig. 1, so as to fit closely against the same. The outer end of the shaft-section G² is screw-threaded and provided with a lock-nut G⁶, by means of which the wheel-hub is held in place. With this construction power from the driving-shaft is communicated through the shaft-section G² to the ring or washer g and by means of the bolts G⁵ to the wheel-hub.

The driving or steering device herein described is constructed to swing on a horizontal pivot located centrally of the front end of the wagon, so that when one of the steering-wheels passes over an elevation it will not twist the wagon-body or running-gear frame. Such horizontal pivot consists in the present instance of the cylindric casing C. The construction by which this result is secured is as follows: The tubular sections $C^2$ are rigidly attached to the casing or drum C, so that when either end of the frame is thrown upwardly by one of the wheels passing over an elevation said drum will be caused to rotate upon its axis. The bearing-block D is not attached rigidly to the casing, so that when said casing is thus partially rotated it turns upon said bearing-block without giving motion to the latter. Said bearing-block is held from rising by means of suitable bands $C^7$, which embrace the under surface of the opposite ends of the casing and are attached at their upper ends to lugs $c^5$, secured rigidly to or made integral with said block D. With this construction said bearing-block D at the upper side and the bands $C^7$ at the lower side provide a seat within which the casing may be rotated as one or the other of the wheels A is moved vertically above the other one. The depending arms $D^2$ of the bearing-block are provided with slots $d$, as shown more clearly in Fig. 1, through which the tubular sections $C'$ and $C^2$ pass and which afford room for the vertical oscillations of said parts. The movement of said tubular sections caused by one of the wheels passing over an elevation is indicated in dotted lines in Fig. 6.

A main or principal feature of our invention is embodied in the construction wherein the stub-axles F are provided with inwardly-extending fork-arms which are pivoted to outwardly-extending fork-arms on the frame and a rotary driving-shaft, each half of which consists of two parts connected by a universal joint, which is located centrally of and in the same vertical plane as the pivotal connection between the axle-section and frame and in which the outer part of said shaft is connected with and drives the wheel mounted on said stub-axle. This arrangement affords an extremely strong and compact construction and at the same time preserves a uniform center of oscillation between the two independently-pivoted parts of the steering and driving mechanisms.

We claim as our invention—

1. The combination with a frame for supporting the front part of a vehicle-body, of a rotative shaft mounted in said frame, shaft-sections joined to said shaft by universal joints, and hollow stub-axles pivoted to said frame by vertical pivots separate from and in vertical alinement with said universal joint, the shaft-sections passing through the stub-axles and being operatively connected with said hubs at the outer ends of the stub-axles.

2. The combination with a rigid frame for supporting the front part of a vehicle-body, said frame being provided with outwardly-extending fork-arms, a rotative shaft mounted in said frame, shaft-sections joined to said shaft by universal joints, stub-axles for the wheel-hubs provided with inwardly-extending fork-arms adapted to overlap and pivoted to the fork-arms on the frame, said pivots being located in vertical alinement with said universal joints, and means connecting said shaft-sections with the wheel-hubs.

3. The combination with a frame for supporting the front of a vehicle-body, of hollow stub-axles adapted to receive the steering-wheels, said axles being pivoted to the frame to swing in horizontal planes, a rotative driving-shaft mounted in said frame, shaft-sections which have bearing in said hollow stub-axles and are connected at their inner ends with said rotative shaft by universal joints, and are connected at their outer ends with said wheel-hubs, said stub-axles being pivoted to the frame by pivots separate from and in alinement with said universal joints.

4. The combination with a frame for supporting the front of a vehicle-body provided with oppositely-extending, vertically-arranged fork-arms on its outer ends, of hollow stub-axles adapted to receive the steering-wheels, said axles being provided with inwardly-extending fork-arms which overlap said fork-arms of the frame and are united thereto by vertical pivots, a rotative driving-shaft in said frame and shaft-sections connected at their inner ends with said rotative shaft by universal joints which are located centrally of and in vertical alinement with the pivotal connection of the stub-axles with the frame, said shaft-sections being connected at their outer ends with the wheel-hubs.

5. The combination with a frame for supporting the front part of a vehicle-body, of a rotative shaft mounted therein, hollow stub-axles pivoted to said frame to swing in horizontal planes and adapted to receive the steering-wheels, shaft-sections connected to said shaft by universal joints and passing through the stub-axles and means for connecting the outer ends of the shaft-sections with the wheel-hubs comprising a flange non-rotatively connected with the outer end of said shaft-section and attached to the outer end of said hub.

6. The combination with a frame for supporting the front part of a vehicle-body, a rotative shaft mounted therein, shaft-sections connected with said shaft by universal joints, hollow stub-axles pivoted to said frame to swing in horizontal planes and adapted to receive a wheel-hub, said shaft-sections extending through said tubular stub-axles, and means for connecting the outer ends of said shaft-sections with the wheel-hub, comprising flanges on the outer ends of said shaft-sections and one or more bolts passing through said flange and engaging longitudinal apertures in said hubs.

7. The combination of a frame for supporting the front of a vehicle-body, a hollow stub-axle pivoted to said frame to swing in a horizontal plane and adapted to receive a steering-wheel, a rotative driving-shaft mounted in said frame, said driving-shaft extending through and having bearing in said hollow stub-axle and adapted for connection at its outer end with the wheel-hub.

8. The combination with the four parts of the shaft, differential-gear mechanism connected with and actuating the two middle parts, universal joints connecting the middle and outer parts, four sleeves forming bearings for the four parts of the shaft, vertical joints connecting the outer and middle sleeves and means connected with the outer sleeves for turning the same in steering the vehicle.

In testimony that we claim the foregoing as our invention we affix our signatures, in presence of two witnesses, this 6th day of January, A. D. 1899.

CHARLES THEODORE HILDEBRANDT.
  FRANK ROSWELL McMULLIN.

Witnesses:
 J. H. HAZZARD,
 R. CUTHBERT VIVIAN.